US012723702B2

(12) United States Patent
Choi et al.

(10) Patent No.: US 12,723,702 B2
(45) Date of Patent: Sep. 1, 2026

(54) DISPLAY DEVICE

(71) Applicant: LG ELECTRONICS INC., Seoul (KR)

(72) Inventors: Yongchai Choi, Seoul (KR); Heungsu Kim, Seoul (KR); Sangmin Kim, Seoul (KR); Huisik Kim, Seoul (KR); Taegon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/838,534

(22) PCT Filed: Feb. 21, 2022

(86) PCT No.: PCT/KR2022/002510
§ 371 (c)(1),
(2) Date: Aug. 14, 2024

(87) PCT Pub. No.: WO2023/157997
PCT Pub. Date: Aug. 24, 2023

(65) Prior Publication Data

US 2025/0164065 A1 May 22, 2025

(51) Int. Cl.
*F16M 11/22* (2006.01)
*F16M 11/08* (2006.01)

(52) U.S. Cl.
CPC ............. *F16M 11/22* (2013.01); *F16M 11/08* (2013.01); *F16M 2200/08* (2013.01)

(58) Field of Classification Search
CPC ................................................. F16M 2200/08

(Continued)

(56) References Cited

U.S. PATENT DOCUMENTS

2003/0103092 A1* 6/2003 Byoun .................. F16M 13/02 345/905
2006/0208145 A1* 9/2006 Chen .................... F16M 11/046 248/289.11

(Continued)

FOREIGN PATENT DOCUMENTS

JP 2013085112 5/2013
JP 2018022188 2/2018

(Continued)

OTHER PUBLICATIONS

PCT International Application No. PCT/KR2022/002510, International Search Report dated Nov. 4, 2022, 3 pages.

*Primary Examiner* — Alfred J Wujciak
(74) *Attorney, Agent, or Firm* — LEE, HONG, DEGERMAN, KANG & WAIMEY

(57) ABSTRACT

Disclosed is a display device. The display device of the present disclosure may include: ahead including a display panel; and a stand adjacent to one side of the head and supporting the head, wherein the stand may include: a body extending long and coupled to the head, the body having a first coupling surface and a second coupling surface which are opposite to each other in a thickness direction of the head; and a leg extending from a distal end of the body in a direction intersecting with a longitudinal direction of the body, wherein the first coupling surface or the second coupling surface may face a rear surface of the head, and a gap between the one side of the head and the leg may vary according to a direction of the body with respect to the rear surface of the head.

15 Claims, 19 Drawing Sheets

(58) Field of Classification Search
USPC ........................................................ 248/188.8
See application file for complete search history.

(56) References Cited

U.S. PATENT DOCUMENTS

| | | | | |
|---|---|---|---|---|
| 2006/0290832 | A1* | 12/2006 | Lin | F16M 11/22 349/58 |
| 2007/0047188 | A1* | 3/2007 | Kim | F16M 11/22 248/371 |
| 2007/0145212 | A1 | 6/2007 | Yamanaka | |
| 2010/0142175 | A1* | 6/2010 | Cheng | H04M 1/04 248/125.7 |
| 2011/0073738 | A1* | 3/2011 | Takao | F16M 11/10 248/397 |
| 2016/0143160 | A1* | 5/2016 | Huang | H04N 5/642 361/728 |
| 2020/0163241 | A1* | 5/2020 | O'Shaughnessy | F16M 11/22 |
| 2021/0329802 | A1* | 10/2021 | Kim | G02F 1/133308 |
| 2021/0364124 | A1* | 11/2021 | Li | A47B 97/00 |

FOREIGN PATENT DOCUMENTS

| | | |
|---|---|---|
| JP | 2018152689 | 9/2018 |
| KR | 1020070021768 | 2/2007 |

* cited by examiner

[FIG. 1]
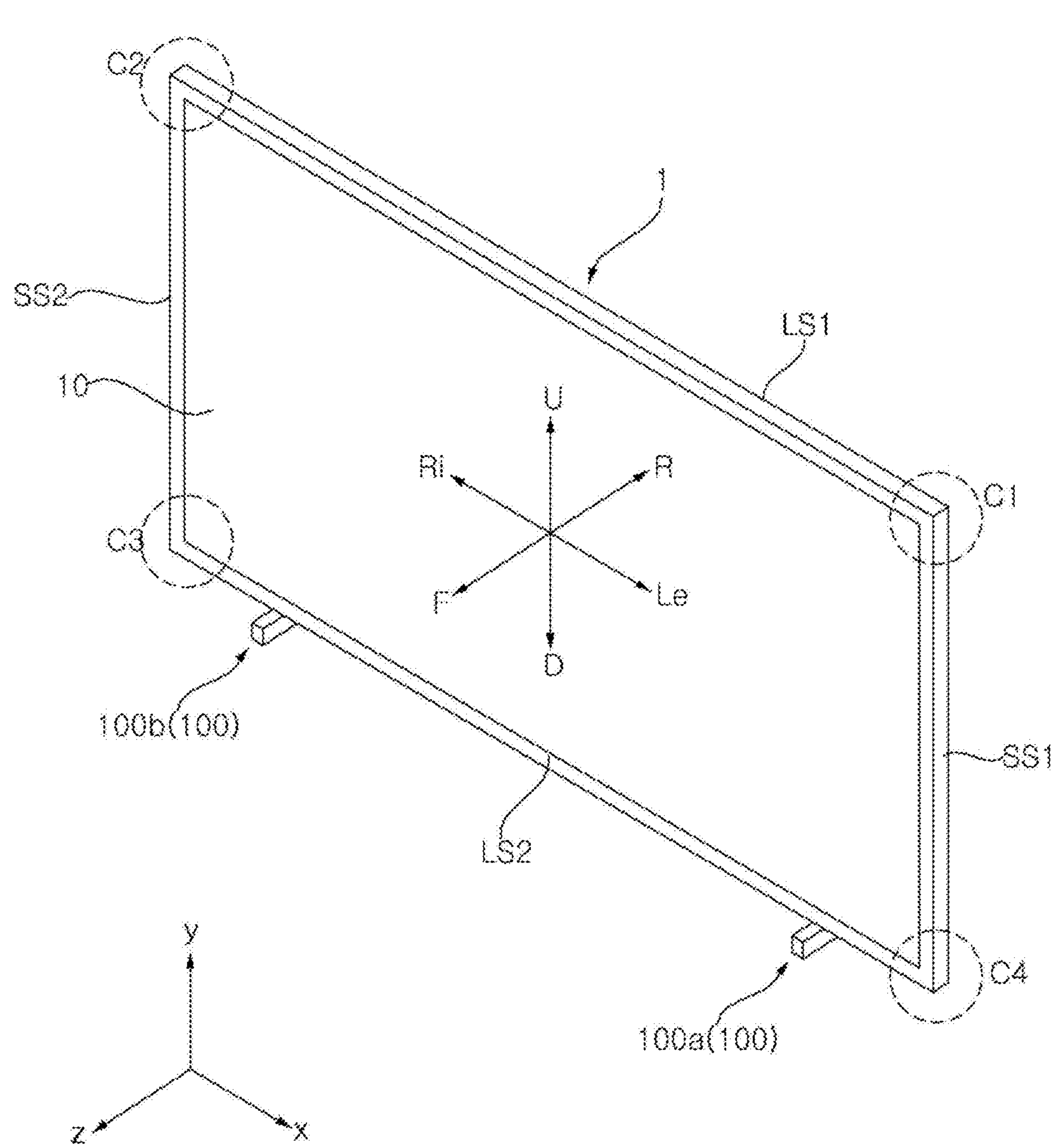

[FIG. 2]
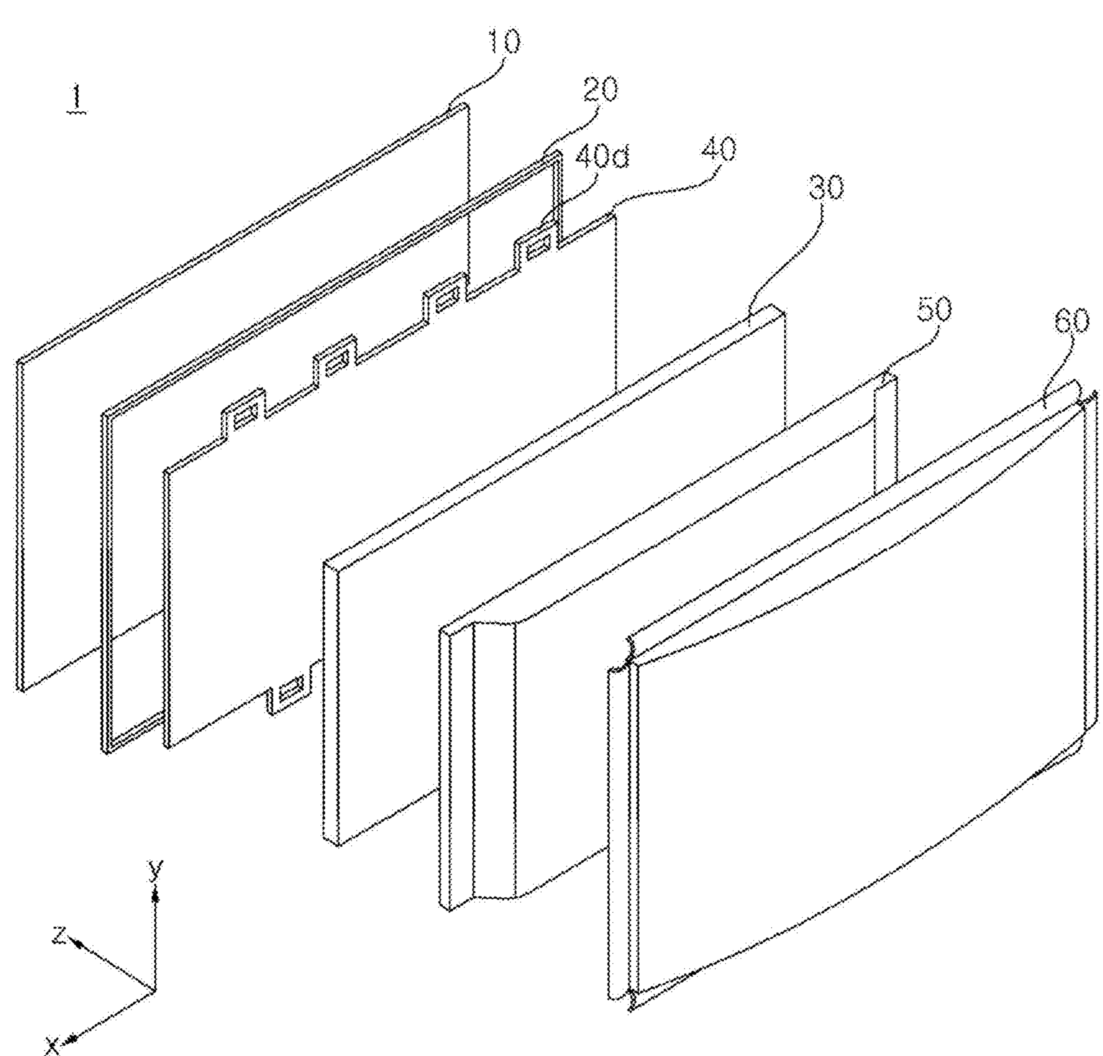

[FIG. 3]
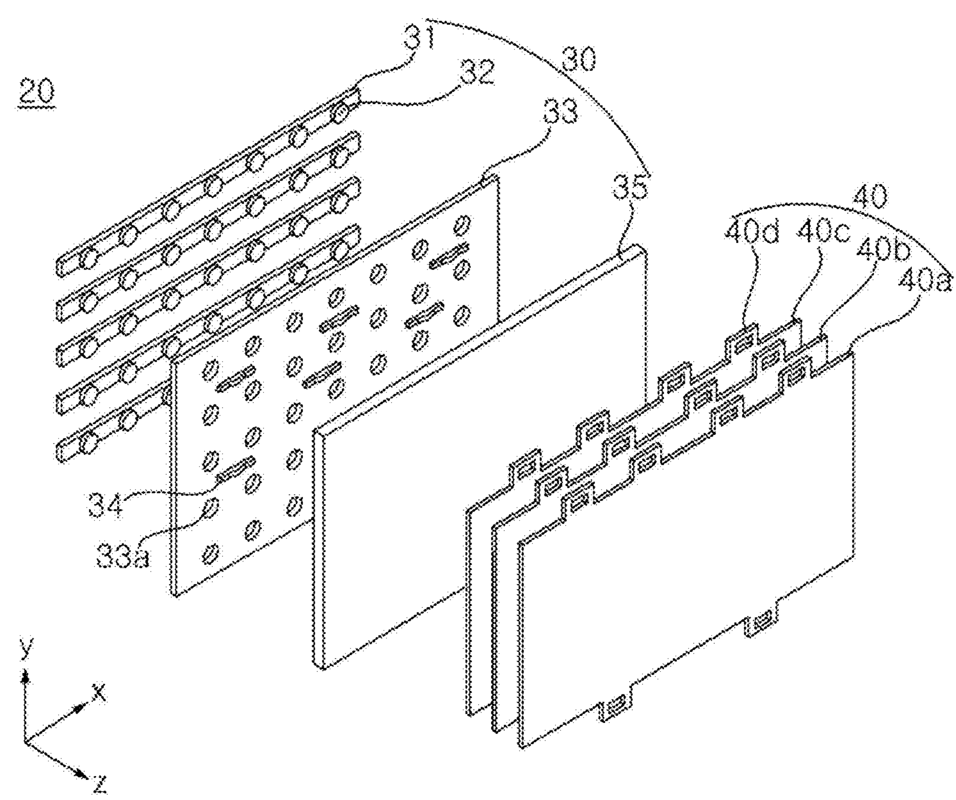

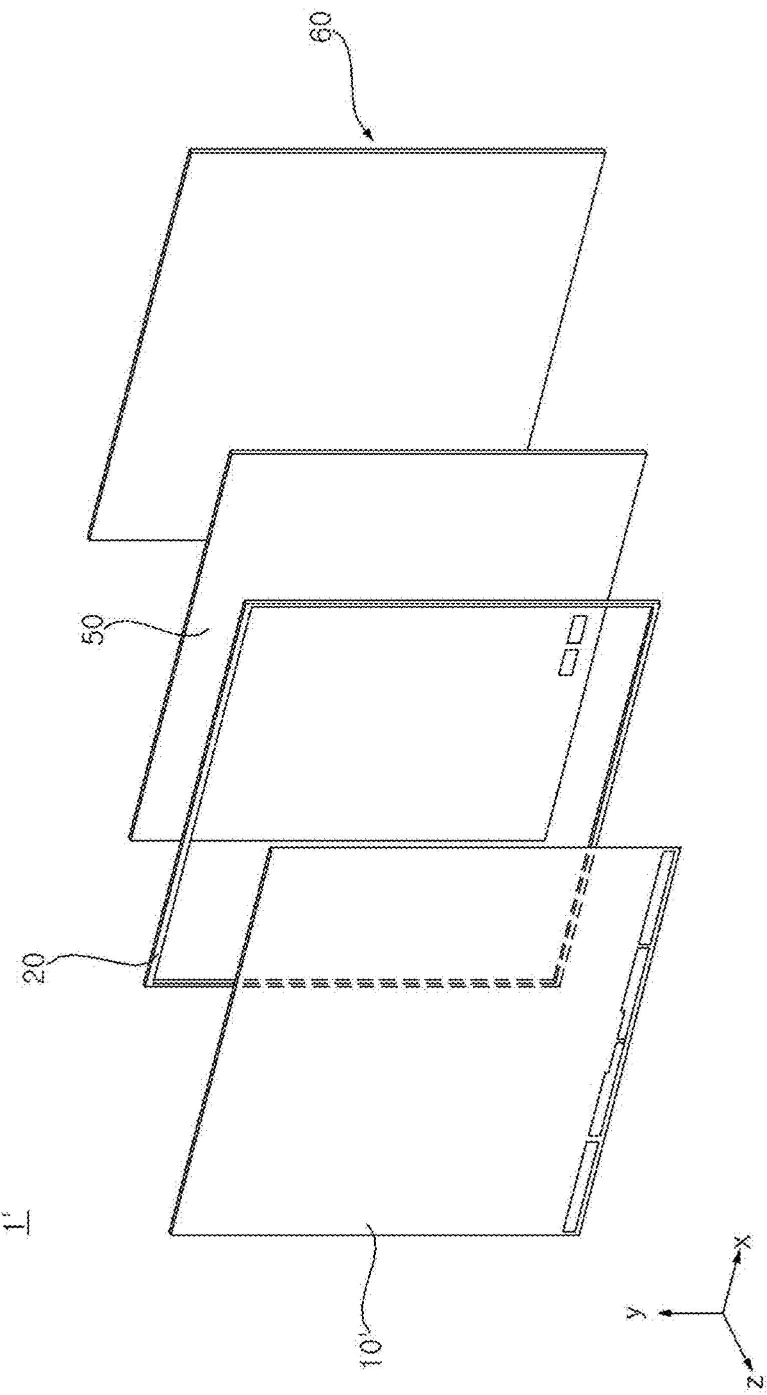
[FIG. 4]
1'
60
50
20
10'
x
y
z

[FIG. 5]
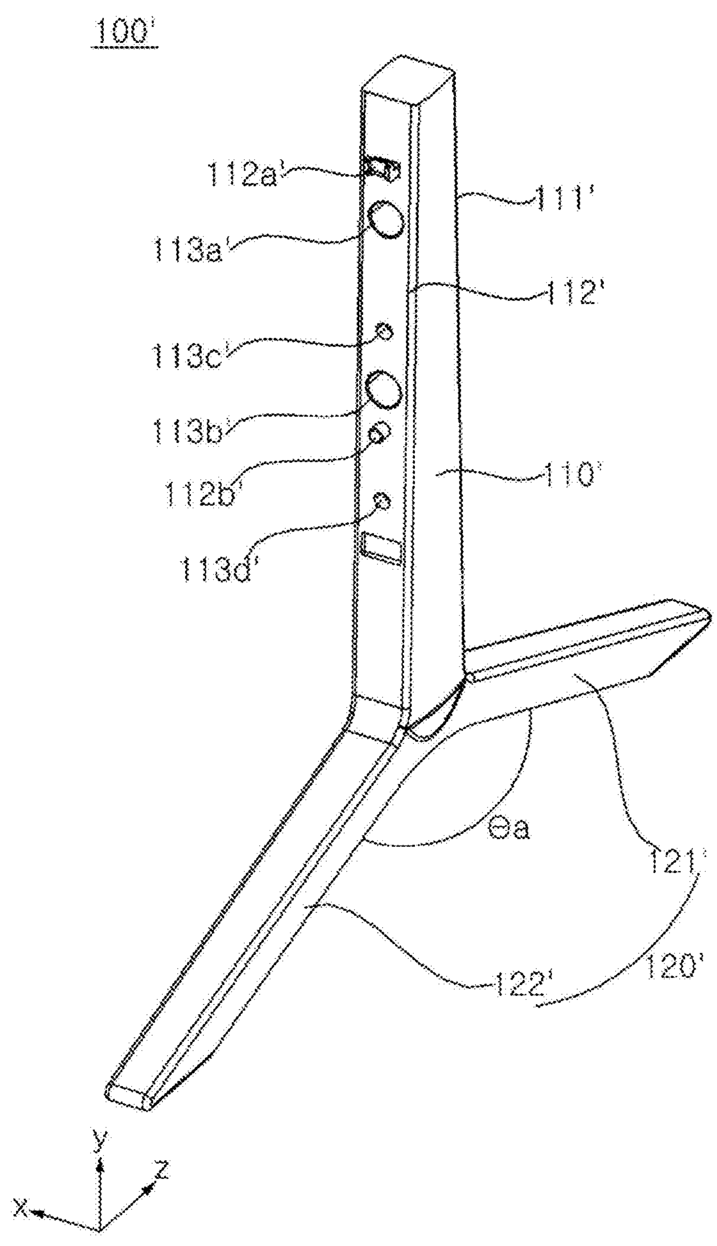

[FIG. 6]
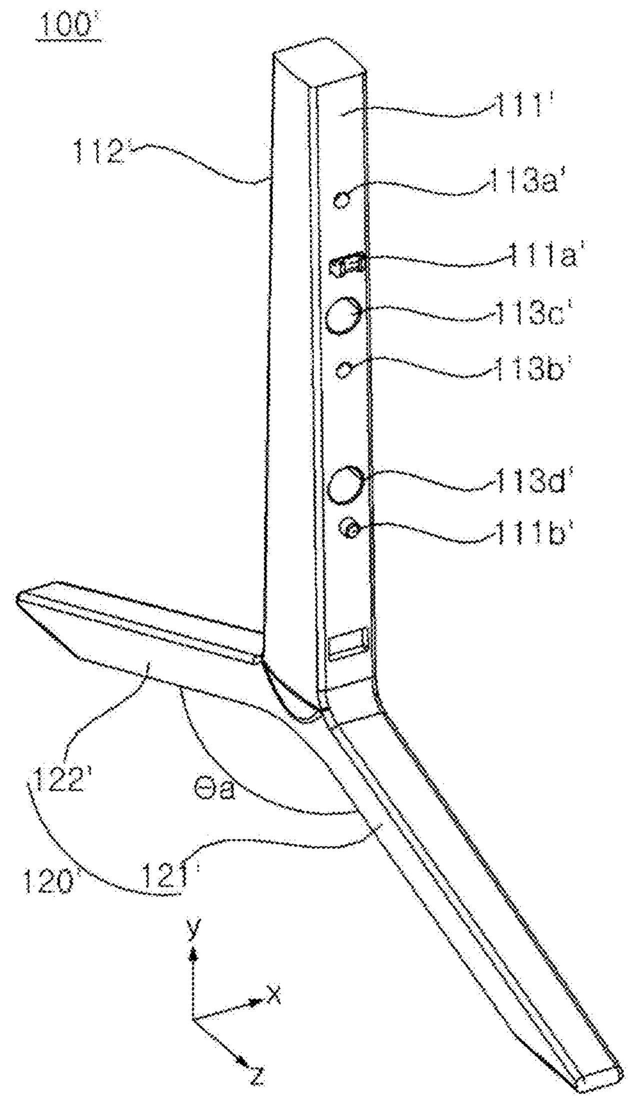

[FIG. 7]
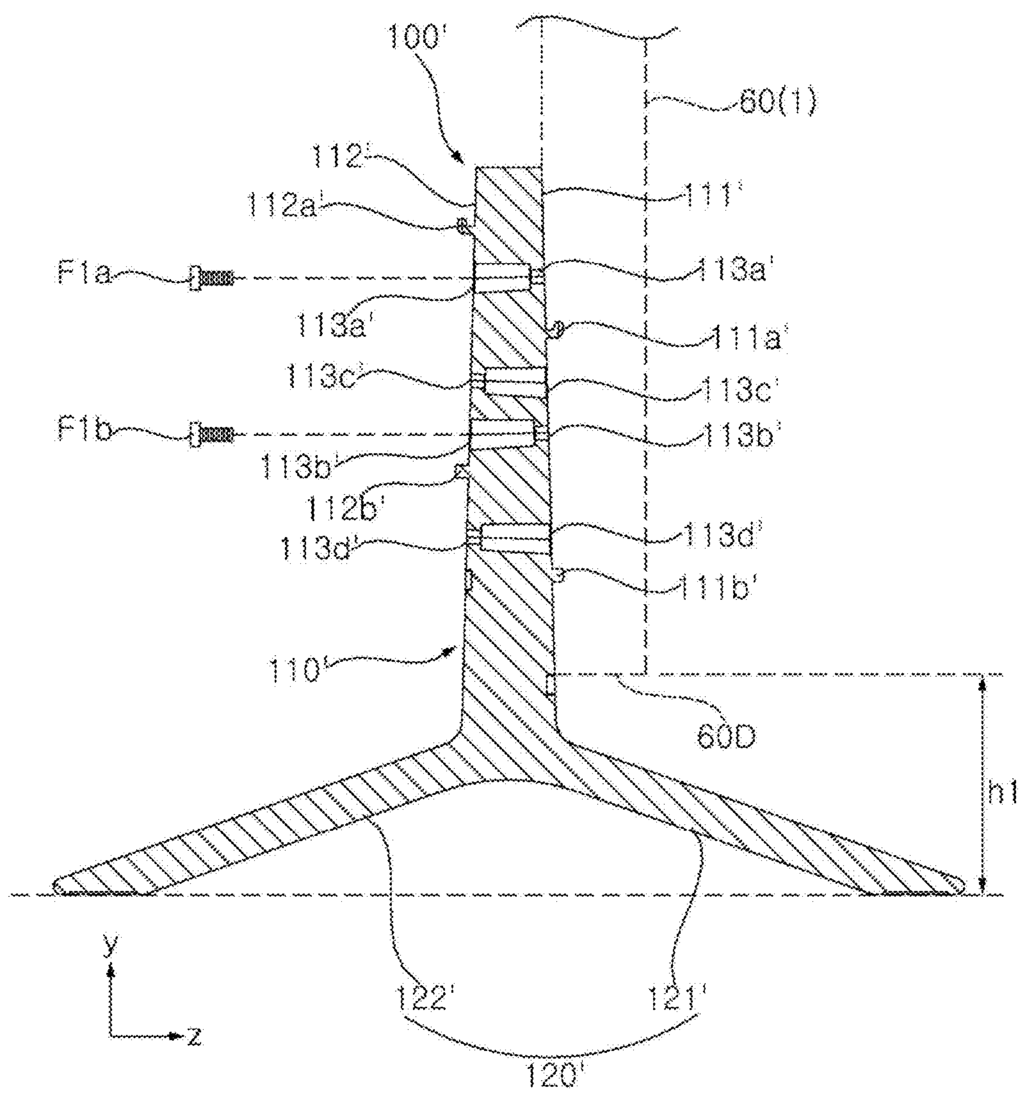

[FIG. 8]
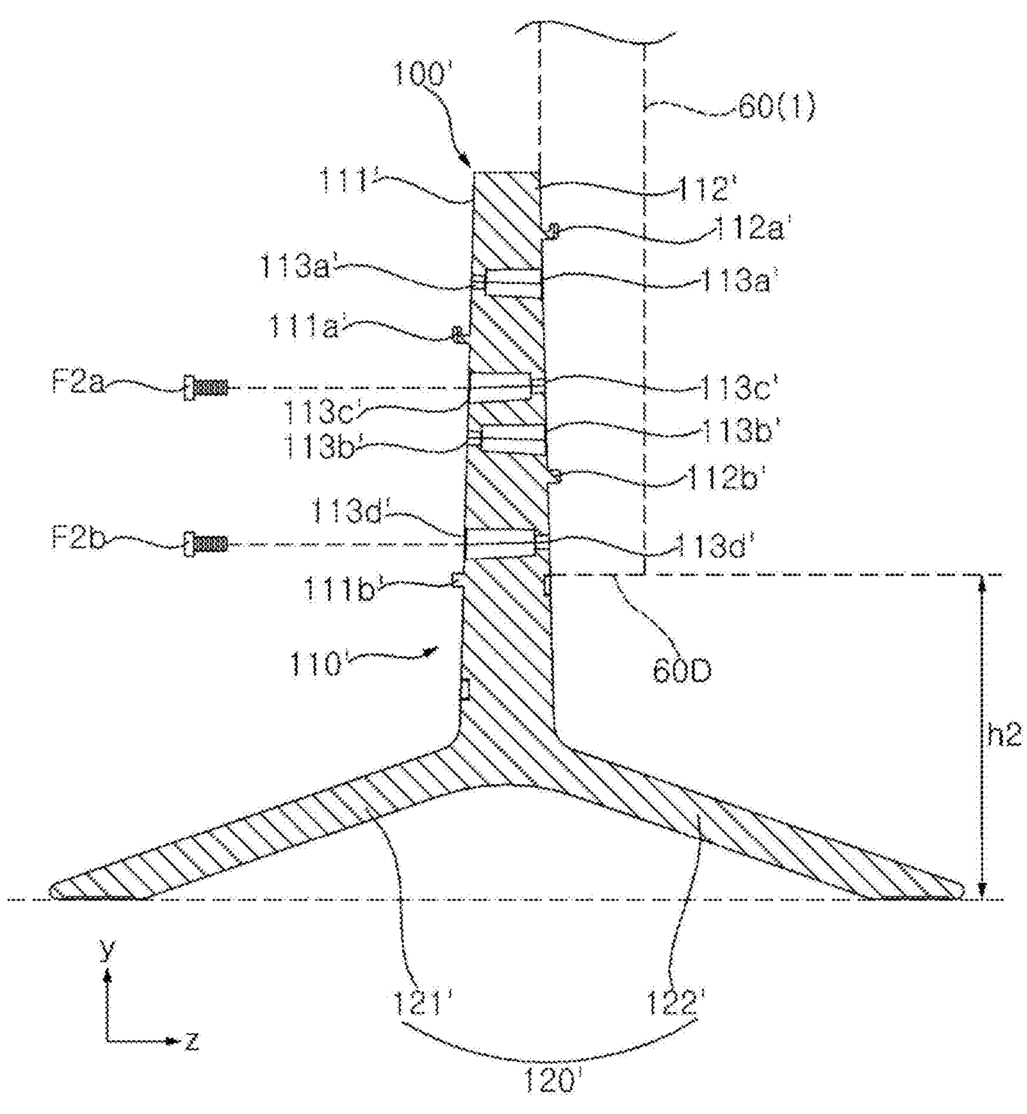

[FIG. 9]
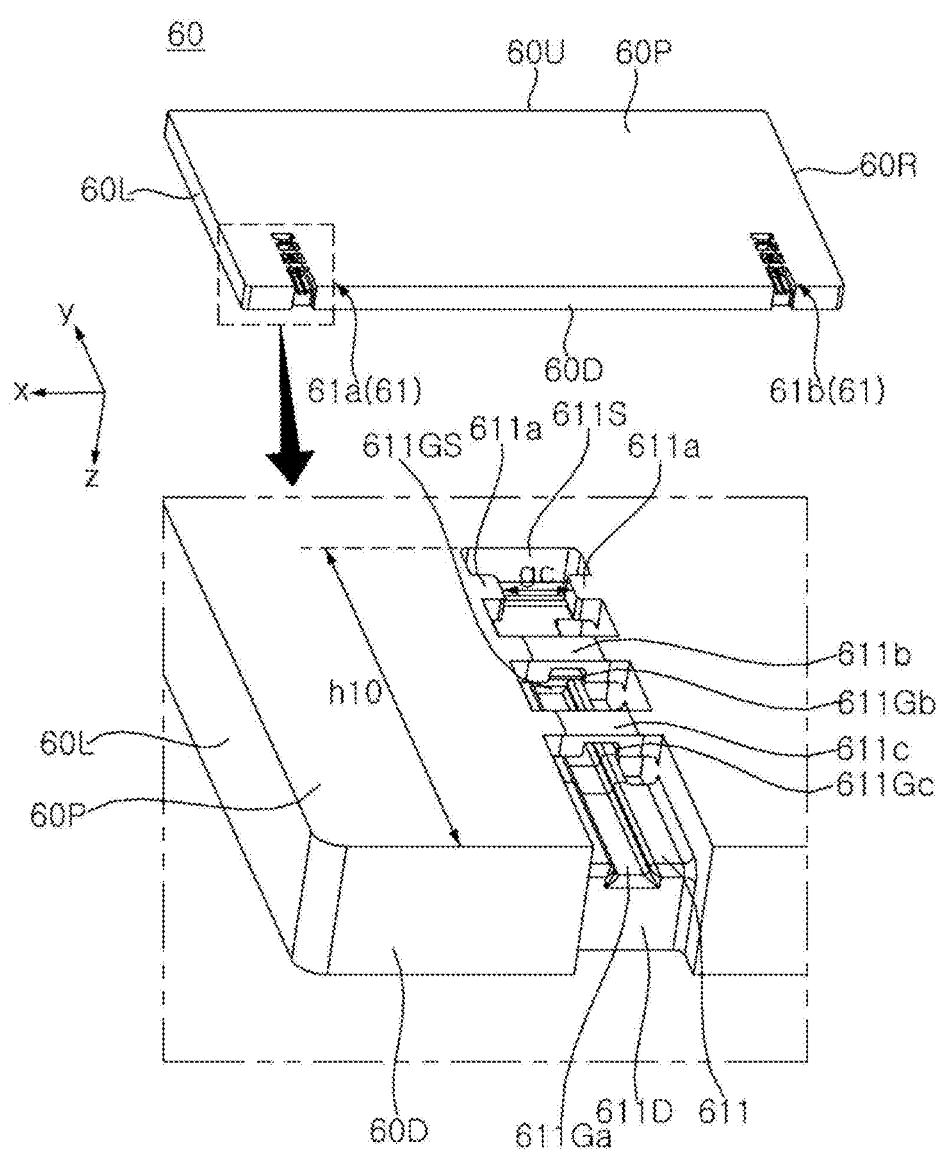

[FIG. 10]
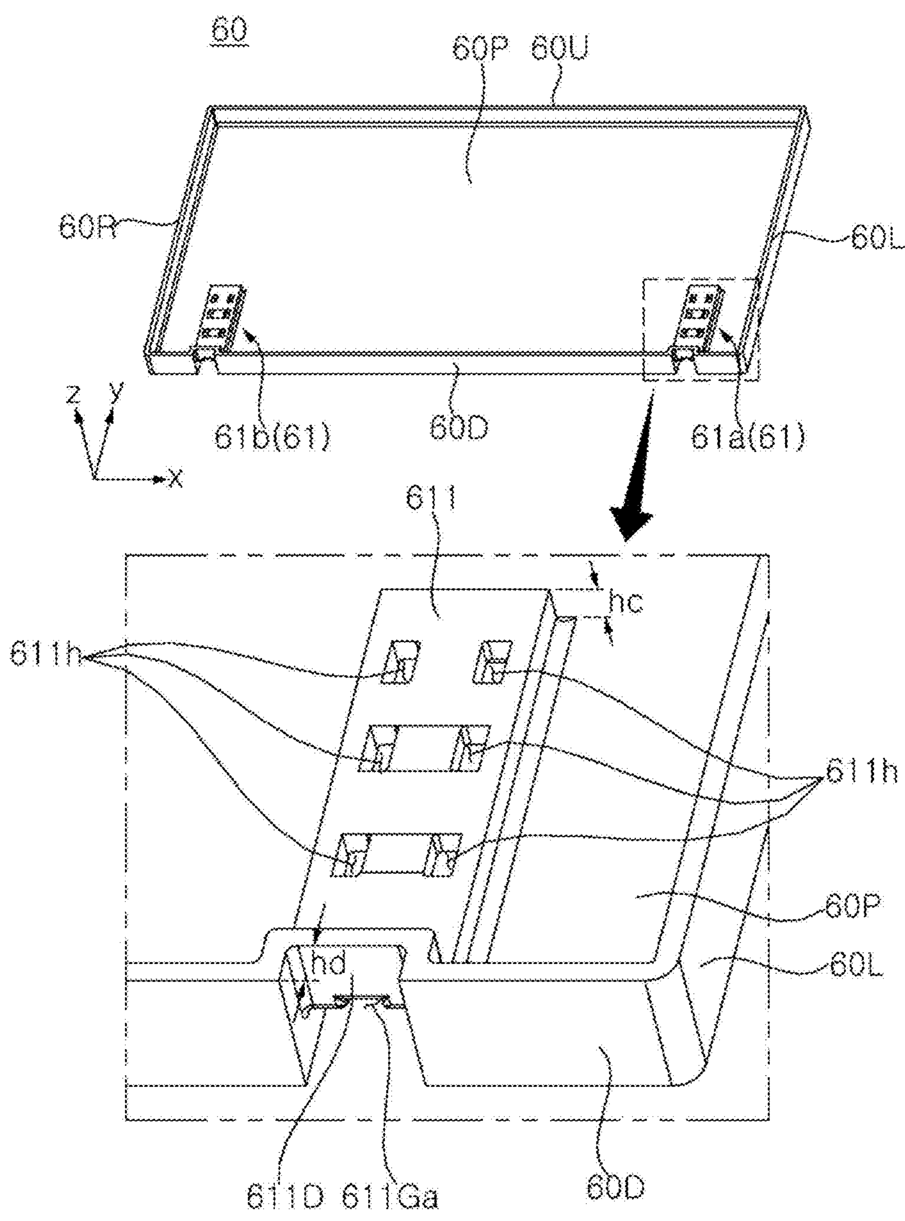

[FIG. 11]
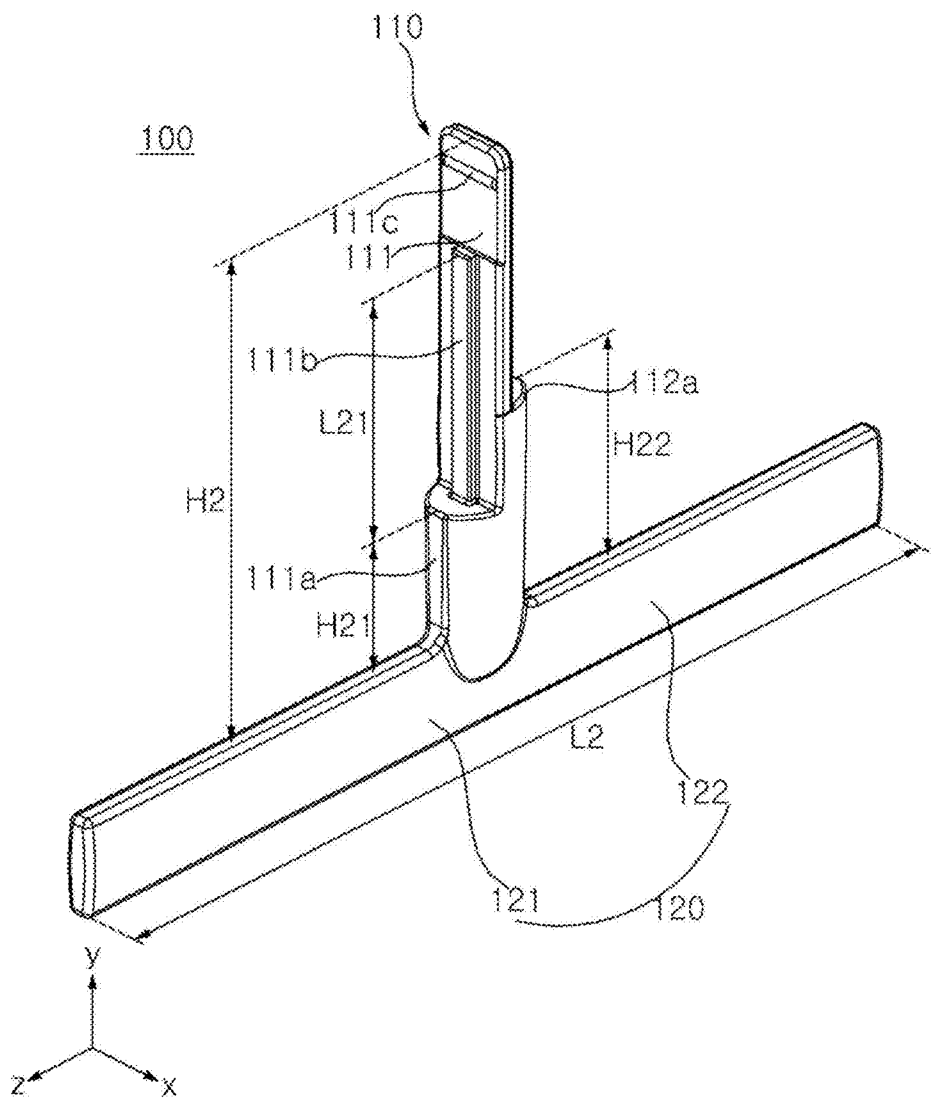

[FIG. 12]
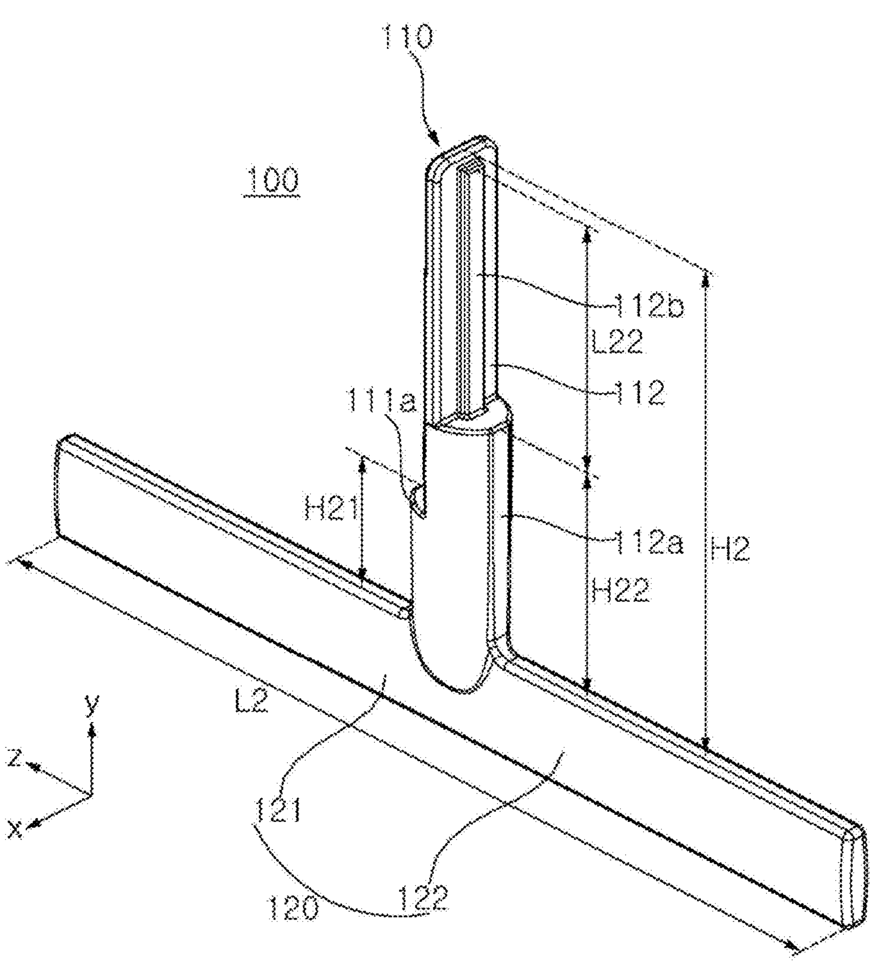

[FIG. 13]
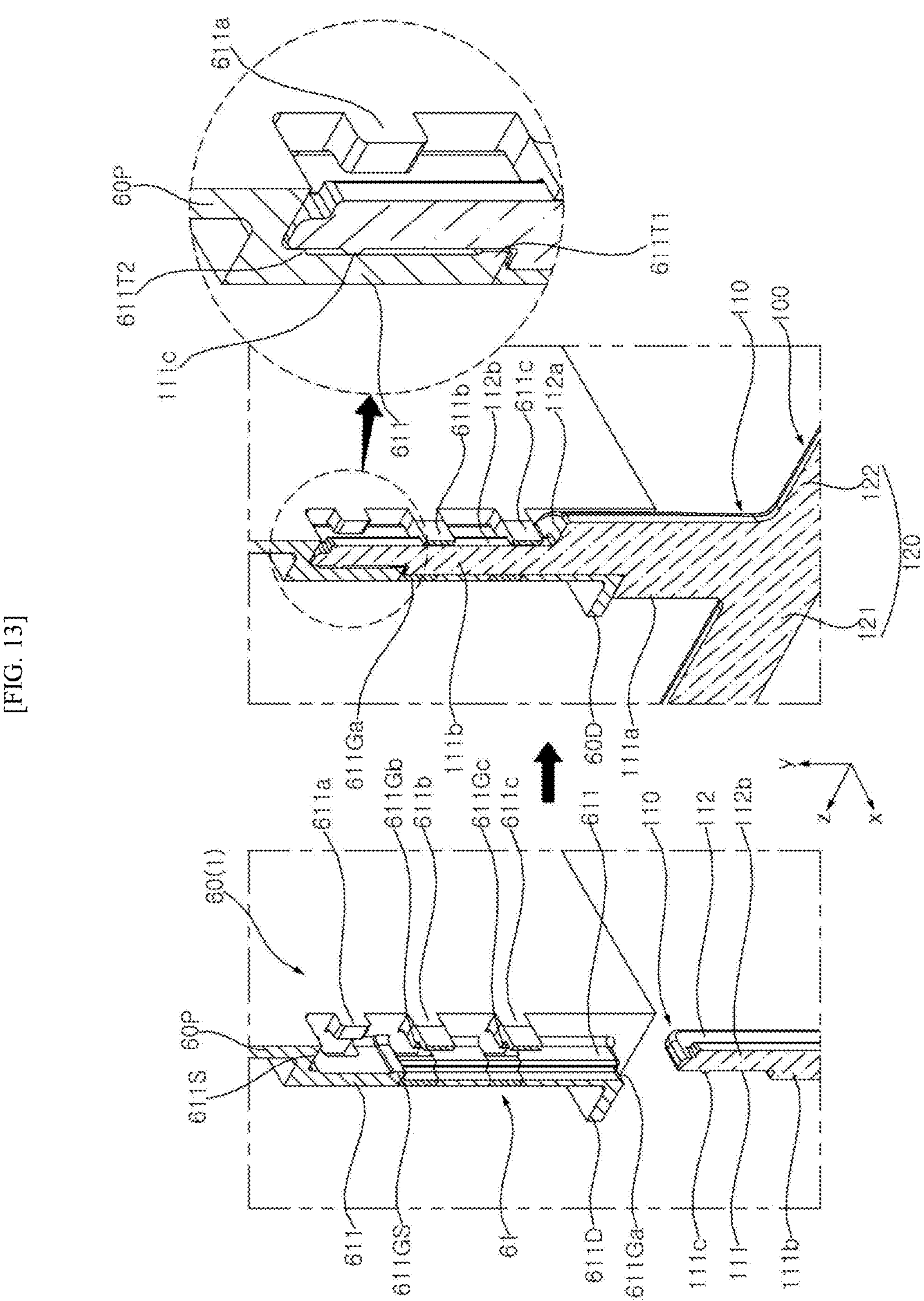

[FIG. 14]
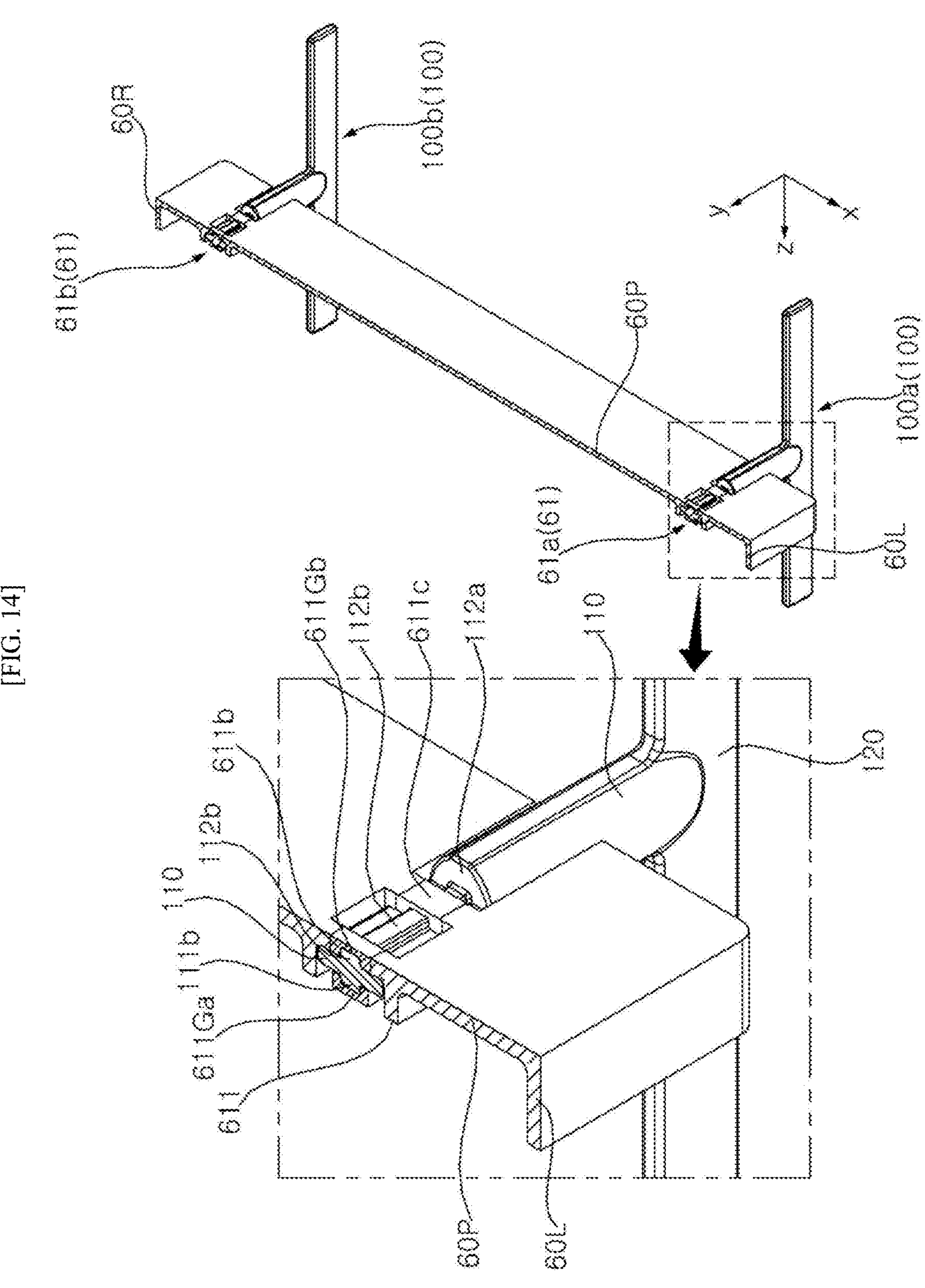

[FIG. 15]
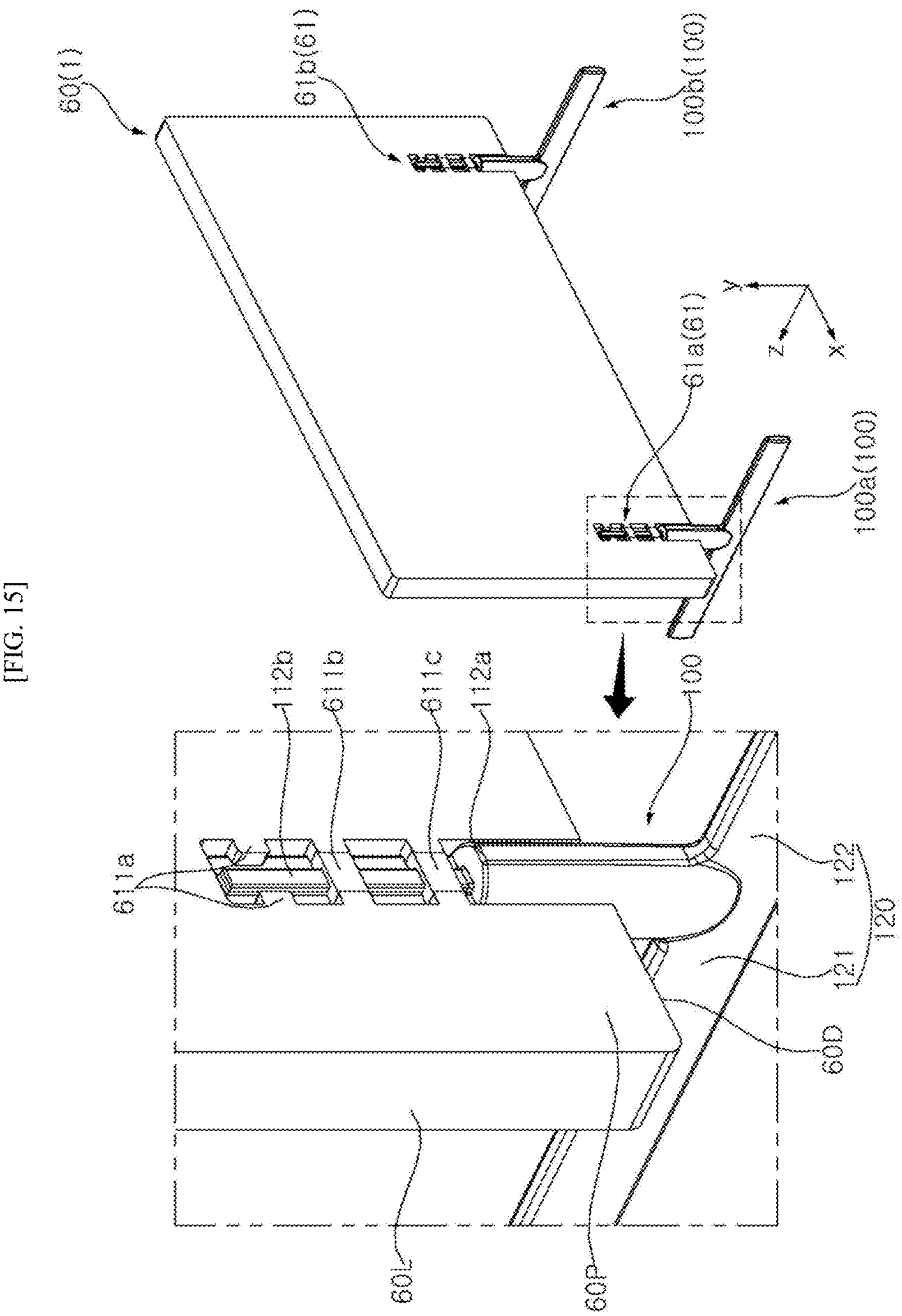

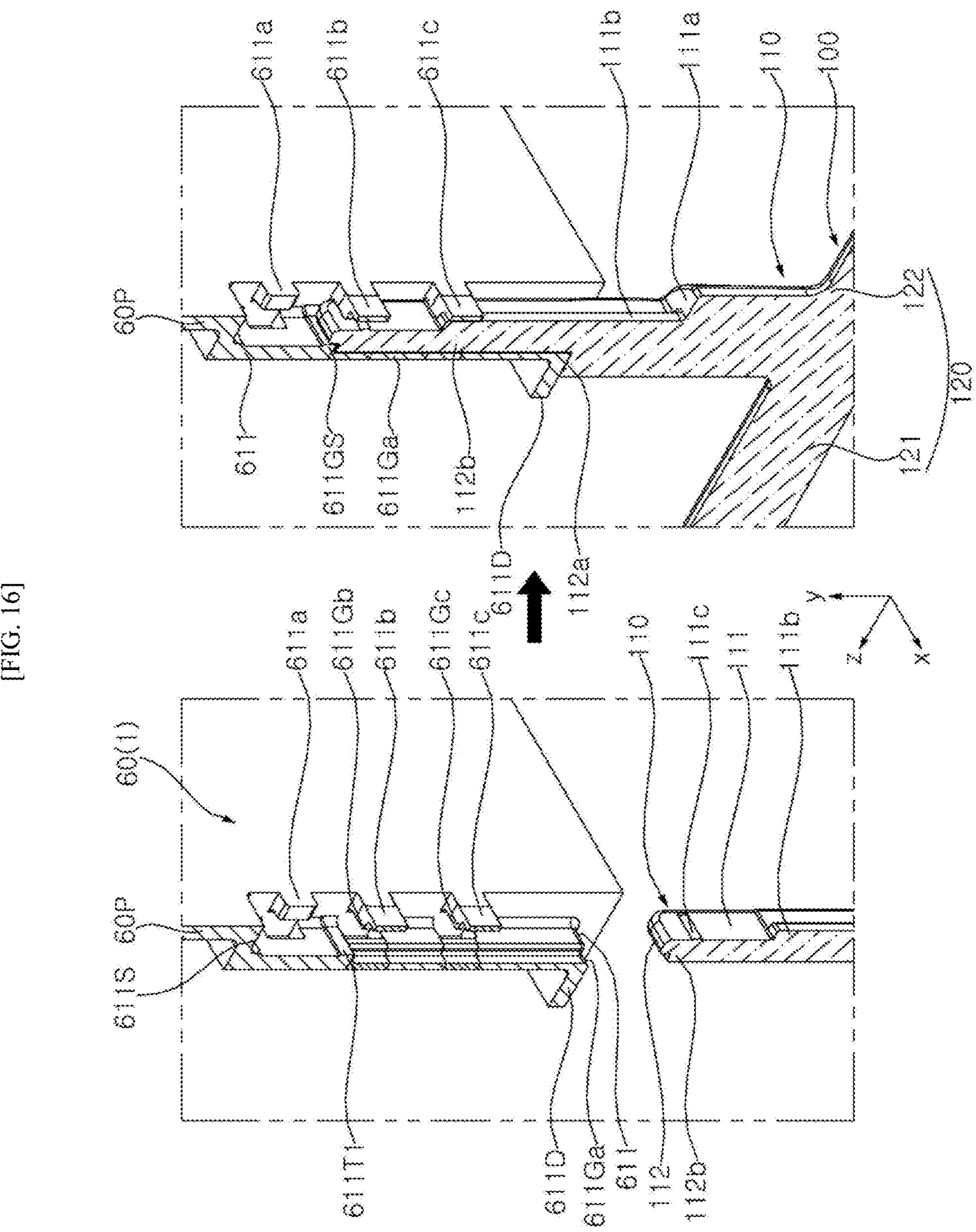
[FIG. 16]
60(1)
611S
60P
611a
611Gb
611b
611Gc
611c
611T1
611D
611Ga
611
112
112b
110
111c
111
111b
611D
112a
611
611GS
611Ga
112b
611a
611b
611c
111b
111a
110
100
122
121
120
y
z
x

[FIG. 17]
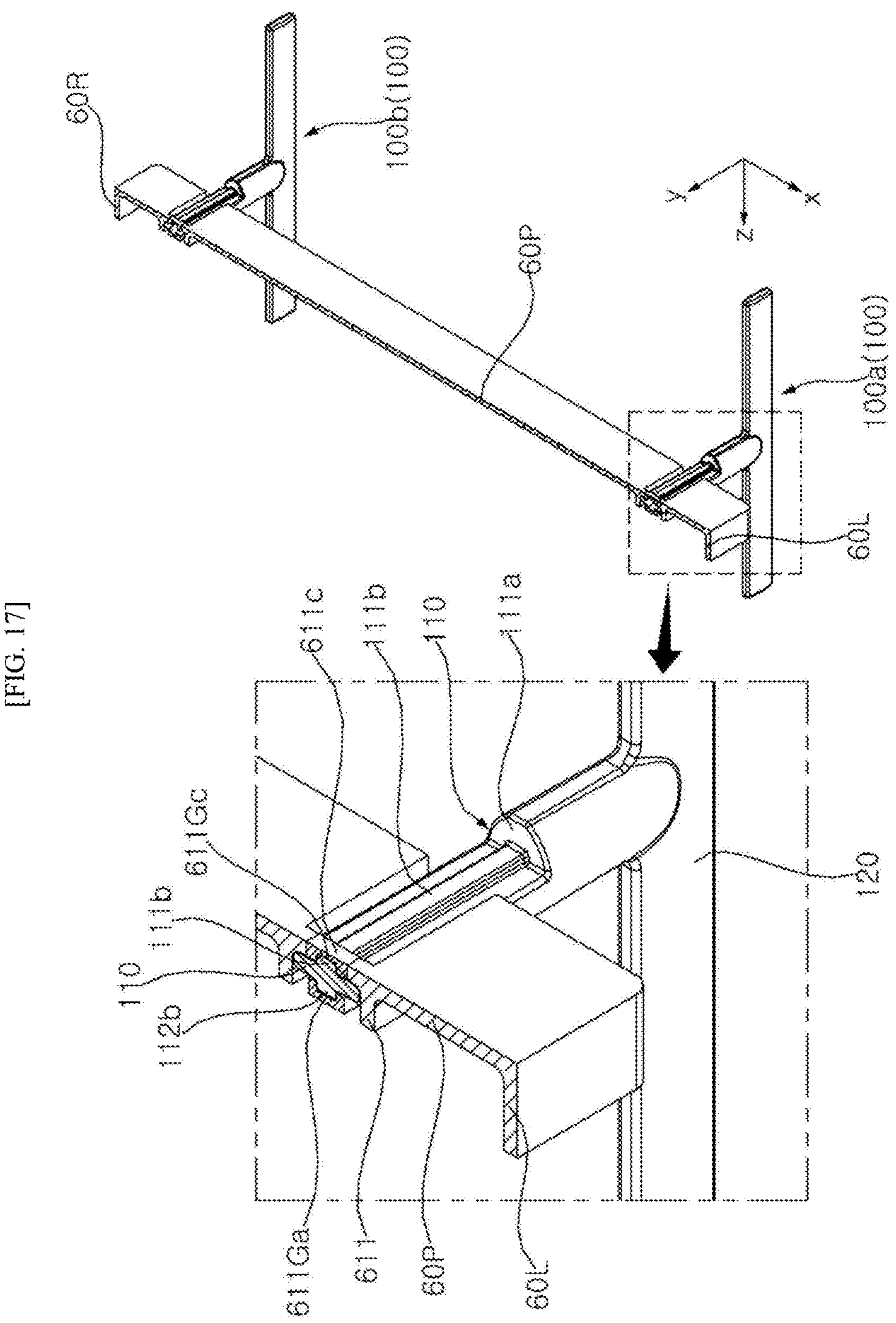

[FIG. 18]
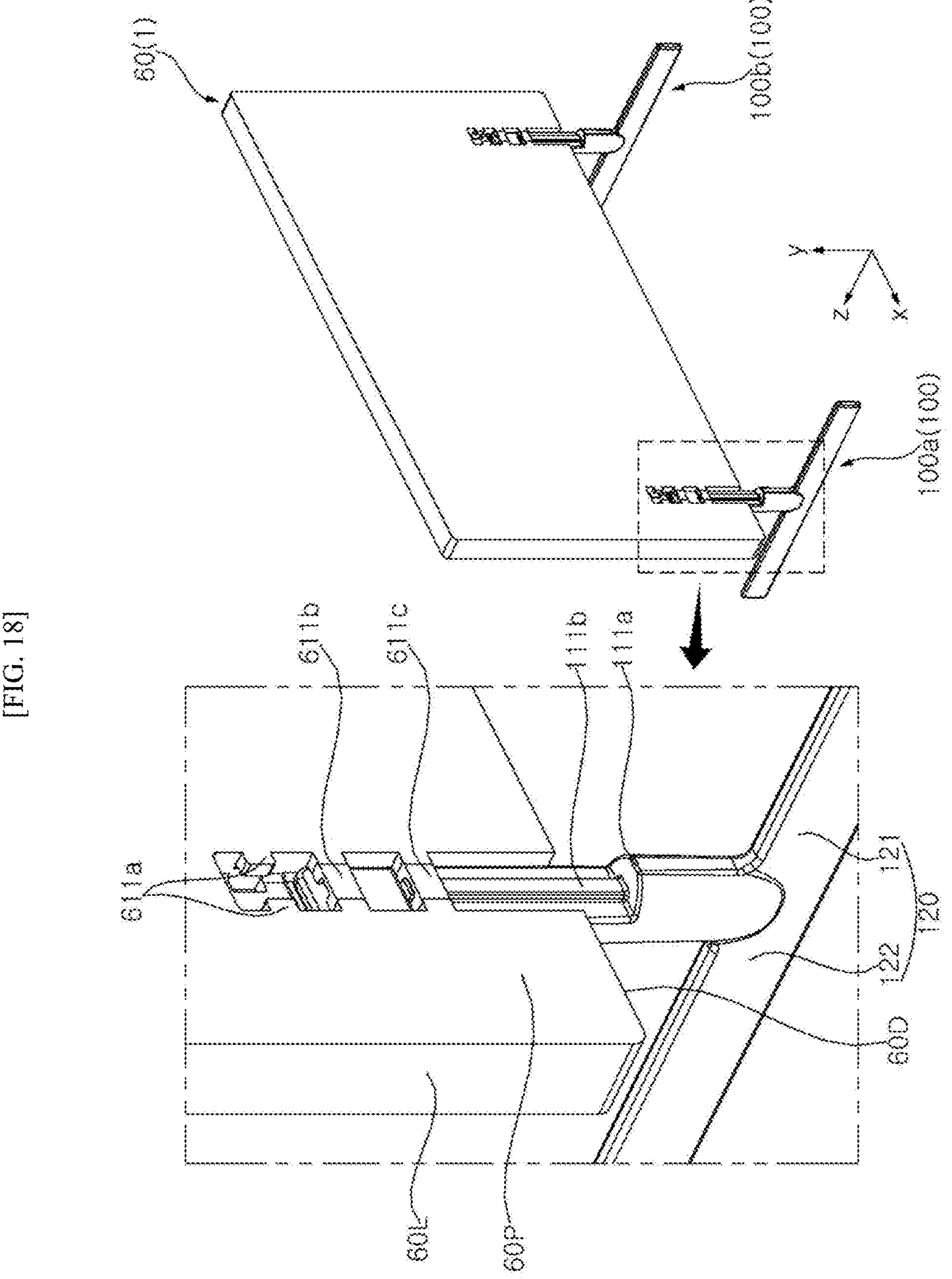

[FIG. 19]
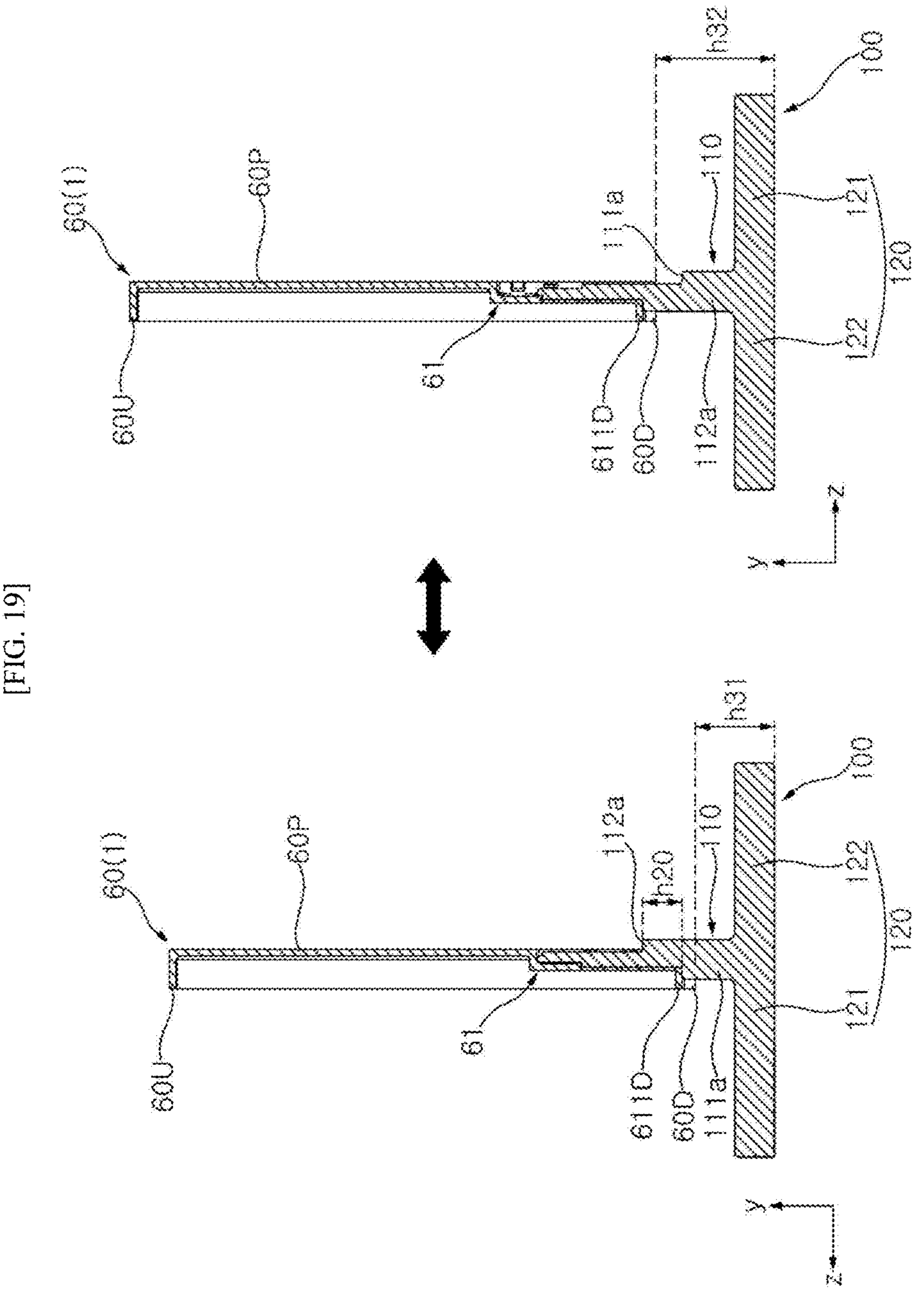

DISPLAY DEVICE

CROSS-REFERENCE TO RELATED APPLICATION(S)

This application is the National Stage filing under 35 U.S.C. 371 of International Application No. PCT/KR2022/002510, filed on Feb. 21, 2022, the contents of which are all incorporated by reference herein in its entirety.

TECHNICAL FIELD

The present disclosure relates to a display device.

BACKGROUND ART

As information society develops, the demand for display devices is also increasing in various forms. In response to this, various display devices such as Liquid Crystal Display Device (LCD), Plasma Display Panel (PDP), Electroluminescent Display (ELD), Vacuum Fluorescent Display (VFD), and Organic Light Emitting Diode (OLED) have been researched and used in recent years.

Among these, a liquid crystal panel includes a TFT substrate and a color filter substrate that face each other with a liquid crystal layer interposed therebetween, and may display an image by using light provided from a backlight unit. In addition, an OLED panel may display an image by depositing an organic material layer capable of self-emitting light on a substrate on which a transparent electrode is formed.

Recently, much research has been conducted on a stand for display device.

DETAILED DESCRIPTION OF INVENTION

Technical Problems

An object of the present disclosure is to solve the above-described problems and other problems.

Another object may be to provide a stand that supports a head including a display panel.

Another object may be to provide a structure that allows a stand to be easily assembled to a head.

Another object may be to provide a structure that can improve the structural stability of a stand coupled to a head.

Another object may be to provide a structure that can adjust the height of a head depending on the direction of coupling of a stand and the head.

Technical Solution

In accordance with an aspect of the present disclosure to achieve the above and other objectives, a display device may include: a head including a display panel; and a stand adjacent to one side of the head and supporting the head, wherein the stand may include: a body extending long and coupled to the head, the body having a first coupling surface and a second coupling surface which are opposite to each other in a thickness direction of the head; and a leg extending from a distal end of the body in a direction intersecting with a longitudinal direction of the body, wherein the first coupling surface or the second coupling surface may face a rear surface of the head, and a gap between the one side of the head and the leg may vary according to a direction of the body with respect to the rear surface of the head.

Effect of Invention

The effects of the display device according to the present disclosure will be described as follows.

According to at least one of the embodiments of the present disclosure, a stand that supports a head including a display panel may be provided.

According to at least one of the embodiments of the present disclosure, a structure that allows a stand to be easily assembled to a head may be provided.

According to at least one of the embodiments of the present disclosure, a structure that can improve the structural stability of a stand coupled to a head may be provided.

According to at least one of the embodiments of the present disclosure, a structure that can adjust the height of a head depending on the direction of coupling of a stand and the head.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

BRIEF DESCRIPTION OF THE DRAWING

FIGS. 1 to 19 are diagrams illustrating examples of a display device according to embodiments of the present disclosure.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

Direction indications of up (U), down (D), left (Le), right (Ri), front (F), and rear (R) shown in the drawings are only for convenience of explanation, and the technical concept disclosed in this specification is not limited thereto.

Hereinafter, a display panel of the present disclosure will be described as an LCD panel (see FIGS. 1 to 3) or an OLED panel (see FIG. 4), but the type of display panel applicable to the present disclosure is not limited thereto.

Referring to FIG. 1, a display device 1 may include a display panel 10. The display panel 10 may display a screen.

The display device 1 may include a first long side LS1, a second long side LS2 opposite to the first long side LS1, a first short side SS1 adjacent to the first and second long sides LS1 and LS2, and a second short side SS2 opposite to the first short side SS1. Meanwhile, for convenience of description, it is illustrated that the length of the long side LS1, LS2 is longer than the length of the short side SS1, SS2, but it may also be possible that the length of the long side LS1, LS2 is substantially equal to the length of the short side SS1, SS2.

The direction parallel to the long side LS1, LS2 of the display device 1 may be referred to as a left-right direction. The direction parallel to the short side SS1, SS2 of the display device 1 may be referred to as an up-down direction. The direction perpendicular to the long side LS1, LS2 and short side SS1, SS2 of the display device 1 may be referred to as a front-rear direction.

The direction in which the display panel 10 displays images may be referred to as a forward direction (F, z), and the opposite direction may be referred to as a rearward direction R. The side of the first long side LS1 may be referred to as an upper side (U, y). The side of the second long side LS2 may be referred to as a lower side D. The side of the first short side SS1 may be referred to as a left side (Le, x). The side of the second short side SS2 may be referred to as a right side Ri.

The first long side LS1, the second long side LS2, the first short side SS1, and the second short side SS2 may be referred to as an edge of the display device 1. In addition, points where the first long side LS1, the second long side LS2, the first short side SS1, and the second short side SS2 meet each other may be referred to as a corner.

For example, a point where the first short side SS1 and the first long side LS1 meet may be referred to as a first corner C1. A point where the first long side LS1 and the second short side SS2 meet may be referred to as a second corner C2. A point where the second short side SS2 and the second long side LS2 meet may be referred to as a third corner C3. A point where the second long side LS2 and the first short side SS1 meet may be referred to as a fourth corner C4.

Referring to FIG. 2, the display device 1 may include a display panel 10, a guide panel 20, a backlight unit 30, 40, a frame 50, and a back cover 60.

The display panel 10 may form the front surface of the display device 1, and may display images. The display panel 10 may display an image by having a plurality of pixels that output Red, Green or Blue (RGB) for each pixel in accordance with a timing. The display panel 10 may be divided into an active area where an image is displayed and a de-active area where an image is not displayed. The display panel 10 may include a front substrate and a rear substrate that are opposite to each other with a liquid crystal layer interposed therebetween. The display panel 10 may be referred to as an LCD panel.

The front substrate may include a plurality of pixels consisting of red, green, and blue subpixels. The front substrate may output light corresponding to the color of red, green, or blue according to a control signal.

The rear substrate may include switching elements. The rear substrate may switch a pixel electrode. For example, the pixel electrode may change the molecular arrangement of a liquid crystal layer according to an externally input control signal. The liquid crystal layer may include liquid crystal molecules. The arrangement of liquid crystal molecules may change in response to a voltage difference generated between the pixel electrode and a common electrode. The liquid crystal layer may transmit or block light provided from the backlight unit 30, 40 to the front substrate.

The guide panel 20 may surround the circumference of the display panel 10, and cover the side surface of the display panel 10. The guide panel 20 may be coupled to the display panel 10 or may support the display panel 10. The guide panel 20 may be referred to as a side frame or middle cabinet.

The backlight unit 30, 40 may be located in a rear of the display panel 10. The backlight unit 30, 40 may include light sources. The backlight unit 30, 40 may be coupled to the frame 50 in front of the frame 50. The backlight unit 30, 40 may be driven by a full driving method or a partial driving method such as local dimming and impulsive driving. The backlight unit 30, 40 may include an optical sheet 40 and an optical layer 30.

The optical sheet 40 may evenly transmit light from the light source to the display panel 10. The optical sheet 40 may be composed of a plurality of layers. For example, the optical sheet 40 may include a prism sheet or a diffusion sheet. Meanwhile, a coupling portion 40*d* of the optical sheet 40 may be coupled to the frame 50 and/or the back cover 60.

The frame 50 may be located in a rear of the backlight unit 30, 40 and may support the components of the display device 1. The edge of the frame 50 may be fixed to the guide panel 20. For example, components such as backlight unit 30, 40 and a printed circuit board (PCB) on which a plurality of electronic devices are located may be coupled to the frame 50. For example, the frame 50 may include a metal material. The frame 50 may be referred to as a main frame, module cover, or cover bottom.

The back cover 60 may cover the rear of the frame 50. The back cover 60 may be coupled to the frame 50. For example, the back cover 60 may include a metal material.

Referring to FIG. 3, the optical layer 30 may include a substrate 31, at least one optical assembly 32, a reflective sheet 33, and a diffusion plate 35. The optical sheet 40 may be located in front of the optical layer 30.

The substrate 31 may extend in the left-right direction and may be provided in the form of a plurality of straps spaced apart from each other in the up-down direction. At least one optical assembly 32 may be mounted on the substrate 31. An electrode pattern may be formed on the substrate 31 to connect an adapter and the optical assembly 32. For example, the electrode pattern may be a carbon nanotube electrode pattern. The substrate 31 may be composed of at least one of polyethylene terephthalate PET, glass, polycarbonate PC, and silicon. The substrate 31 may be a printed circuit board PCB on which at least one optical assembly 32 is mounted.

The optical assembly 32 may be a light emitting diode LED chip or a light emitting diode package including at least one light emitting diode chip. The light assembly 32 may be composed of a colored LED or a white LED that emits at least one color among colors such as red, green, and blue. A colored LED may include at least one of red LED, green LED, and blue LED.

The reflective sheet 33 may be located in front of the substrate 31. At least one hole 33*a* may be formed to penetrate the reflective sheet 33, and the optical assembly 32 may be located in the hole 33*a*. The reflective sheet 33 may reflect light provided from the optical assembly 32 or reflected from the diffusion plate 35 in a forward direction. For example, the reflective sheet 33 may include a metal having a high reflectivity, such as at least one of aluminum Al, silver Ag, gold Au, and titanium dioxide TiO2 and/or metal oxide.

In addition, an air gap may be formed between the reflective sheet 33 and the diffusion plate 35. The air gap may serve as a buffer, and the light provided from the optical assembly 32 may be spread widely by the air gap. A supporter 34 may be located between the reflective sheet 33 and the diffusion plate 35 and may form the air gap.

The diffusion plate 35 may be located in front of the reflective sheet 33. The diffusion plate 35 may be located between the reflective sheet 33 and the optical sheet 40.

The optical sheet 40 may include at least one sheet. For example, the optical sheet 40 may include one or more prism sheets and/or one or more diffusion sheets. A plurality of sheets of the optical sheet 40 may be adhered to or in close contact with each other.

Specifically, the optical sheet 40 may be composed of a plurality of sheets having different functions. For example, the optical sheet 40 may include a first optical sheet 40*a*, a second optical sheet 40*b*, and a third optical sheet 40*c*. For example, the first optical sheet 40*a* may be a diffusion sheet, and the second optical sheet 40*b* and the third optical sheet 40*c* may be a prism sheet. The diffusion sheet may prevent the light emitted from the diffusion plate 35 from being partially concentrated, resulting in a more uniform distribution of light. The prism sheet may condense the light emitted from the diffusion plate 35 and provide it to the display panel 10. Meanwhile, the number and/or location of the diffusion sheet and the prism sheet may be changed.

Referring to FIG. 4, a display device 1' may include a display panel 10', a guide panel 20, a frame 50, and a back cover 60.

The display panel 10' may form the front surface of the display device 1' and may display an image. The display panel 10' may divide an image into a plurality of pixels and output an image adjusted with color, brightness, and saturation for each pixel. The display panel 10' may be divided into an active area where an image is displayed and a de-active area where an image is not displayed. The display panel 10' may generate light corresponding to the color of red, green, or blue according to a control signal. The display panel 10' may be referred to as an OLED panel.

The guide panel 20 may surround the circumference of the display panel 10' and cover the side surface of the display panel 10'. The guide panel 20 may be coupled to the display panel 10' or may support the display panel 10'. The guide panel 20 may be referred to as a side frame or middle cabinet.

The frame 50 may be located in a rear of the display panel 10', and the display panel 10' may be coupled thereto. The edge of the frame 50 may be fixed to the guide panel 20. Electronic components may be mounted on the frame 50. For example, the frame 50 may include a metal material. The frame 50 may be referred to as a main frame, module cover, or cover bottom.

The back cover 60 may cover the rear of the frame 50. The back cover 60 may be coupled to the frame 50. For example, the back cover 60 may include a metal material.

Referring to FIGS. 5 and 6, a stand 100' may include a body 110' and a leg 120'.

The body 110' may extend in the up-down direction. The body 110' may have an overall square pillar shape. A first coupling surface 111' may form the front surface of the body 110', and a second coupling surface 112' may form the rear surface of the body 110'.

A first hook 111*a'* may protrude in a forward direction from the first coupling surface 111' and may have a shape bent once upward. A first pin 111*b'* may protrude in a forward direction from the first coupling surface 111' and may be spaced downward from the first hook 111*a'*.

A first coupling hole 113*a'*, 113*b'* may be formed to penetrate the body 110' in the front-rear direction. The diameter of the first coupling hole 113*a'*, 113*b'* on the first coupling surface 111' may be smaller than the diameter of the first coupling hole 113*a'*, 113*b'* on the second coupling surface 112'. The diameters of the first coupling hole 113*a'*, 113*b'* may gradually increase from the first coupling surface 111' toward the second coupling surface 112'. A first upper coupling hole 113*a'* may be spaced upward from the first hook 111*a'*, and a first lower coupling hole 113*b'* may be spaced downward from the first hook 111*a'*.

A second hook 112*a'* may protrude in a rearward direction from the second coupling surface 112' and may have a shape bent once upward. A second pin 112*b'* may protrude in a rearward direction from the second coupling surface 112' and may be spaced downward from the second hook 112*a'*. The second hook 112*a'* may be located closer to the upper end of the body 110' than the first hook 111*a'*. In the up-down direction, the distance between the second hook 112*a'* and the second pin 112*b'* may be equal to the distance between the first hook 111*a'* and the first pin 111*b'*.

A second coupling hole 113*c'*, 113*d'* may be formed to penetrate the body 110' in the front-rear direction. The diameter of the second coupling hole 113*c'*, 113*d'* on the second coupling surface 112' may be smaller than the diameter of the second coupling hole 113*c'*, 113*d'* on the first coupling surface 111'. The diameters of the second coupling hole 113*c'*, 113*d'* may gradually increase from the second coupling surface 112' toward the first coupling surface 111'. A second upper coupling hole 113*c'* may be located between the first upper coupling hole 113*a'* and the first lower coupling hole 113*b'*. A second lower coupling hole 113*d'* may face the second upper coupling hole 113*c'* with respect to the first lower coupling hole 113*b'*. The first lower coupling hole 113*b'* may be located closer to the second upper coupling hole 113*c'* than the second lower coupling hole 113*d'*. The distance between the second upper coupling hole 113*c'* and the second lower coupling hole 113*d'* may be equal to the distance between the first upper coupling hole 113*a'* and the first lower coupling hole 113*b'*.

The leg 120' may include a first leg 121' and a second leg 122'. The first leg 121' may be connected to the lower side of the first coupling surface 111' and may form an obtuse angle with respect to the first coupling surface 111'. The second leg 122' may be connected to the lower side of the second coupling surface 112' and may form an obtuse angle with respect to the second coupling surface 112'. The angle (theta a) between the first leg 121' and the second leg 122' may be an obtuse angle. Meanwhile, in some embodiment, the first leg 121' and the second leg 122' may extend straight in the front-rear direction. Alternatively, in some embodiment, the leg 120' may have a circular or polygonal plate shape, or have a ring or open-ring shape.

Referring to FIGS. 7 and 8, the stand 100' may be coupled to the back cover 60 while being adjacent to the lower side of the back cover 60 and support the display device 1. The stand 100' may be a component of the display device 1, and the display device 1 excluding the stand 100' may be referred to as a head 1.

For example, the stand 100' may include a plurality of stands spaced apart from each other along the lower side of the back cover 60. A first stand may be adjacent to the lower and left sides of the back cover 60, and the second stand may be adjacent to the lower and right sides of the back cover 60. Accordingly, the stand 100' may stably support the head 1.

Referring to FIG. 7, the first coupling surface 111' may face the rear surface of the back cover 60. The first pin 111*b*' may be inserted into the back cover 60, and the back cover 60 may be hooked to the first hook 111*a*'. That is, the first pin 111*b*' and the first hook 111*a*' may guide the coupling of the back cover 60 and the stand 100'. The fastening member F1*a*, F1*b*, such as a screw, may penetrate the first coupling hole 113*a*', 113*b*' and be fastened to the back cover 60. Accordingly, the stand 100' may be coupled to the rear surface of the back cover 60. At this time, the lower side 60D of the head 1 or the back cover 60 may be located at a first height h1 from the ground.

Referring to FIG. 8, the second coupling surface 112' may face the rear surface of the back cover 60. The second pin 112*b*' may be inserted into the back cover 60, and the back cover 60 may be hooked to the second hook 112*a*'. That is, the second pin 112*b*' and the second hook 112*a*' may guide the coupling of the back cover 60 and the stand 100'. The fastening member F2*a*, F2*b*, such as a screw, may penetrate the second coupling hole 113*c*', 113*d*' and be fastened to the back cover 60. Accordingly, the stand 100' may be coupled to the rear surface of the back cover 60. At this time, the lower side 60D of the head 1 or the back cover 60 may be located at a second height h2 from the ground.

The second height h2 may be greater than the first height h1. That is, a user adjusts the direction of the stand 100' so that the second coupling surface 112' or the first coupling surface 111' faces the rear surface of the back cover 60, thereby adjusting the distance between the ground and the head 1. Meanwhile, in some embodiment, at least a portion of the body 110' may be accommodated inside the back cover 60, and the body 110' may be coupled to the inside of the back cover 60.

Referring to FIGS. 9 and 10, the back cover 60 may include a rear portion 60P, an upper portion 60U, a lower portion 60D, a left portion 60L, and a right portion 60R. The rear portion 60P may form the rear surface of the back cover 60. The upper portion 60U may be bent forward from the upper side of the rear portion 60P and may form the upper side of the back cover 60. The lower portion 60D may be bent forward from the lower side of the rear portion 60P and may form the lower side of the back cover 60. The left portion 60L may be bent forward from the left side of the rear portion 60P and may form the left side of the back cover 60. The right portion 60R may be bent forward from the right side of the rear portion 60P and may form the right side of the back cover 60.

The coupling portion 61 may be formed in the rear portion 60P and the lower portion 60D. The coupling portion 61 may include a guide portion 611, a recessed portion 611D, and a bridge 611*a*, 611*b*, 611*c*.

The guide portion 611 may be formed by being pressed from the rear surface of the rear portion 60P in a forward direction, and may extend in the vertical direction. The height of the guide portion 611 in the vertical direction may be h10 (see FIG. 9), and the step difference between the guide portion 611 and the rear portion 60P may be hc (see FIG. 10). For example, a plurality of holes 611*h* may be formed to penetrate the guide portion 611 in the front-rear direction.

The recessed portion 611D may be formed by being pressed upward from the lower surface of the lower portion 60D, and may be connected to the lower side of the guide portion 611. The width of the recessed portion 611D may be equal to the width of the guide portion 611, and the step difference between the recessed portion 611D and the lower portion 60D may be hd (see FIG. 10).

A front groove 611Ga may be formed on the rear surface of the guide portion 611 and may extend upward from the lower side of the guide portion 611. The height of the front groove 611Ga in the vertical direction may be smaller than the height h10 of the guide portion 611. In other words, in the vertical direction, the front groove 611Ga may be located in one section of the guide portion 611.

The bridge 611*a*, 611*b*, 611*c* may be located in a rear of the guide portion 611 and may be connected to the lateral side of the guide portion 611. The bridge 611*a*, 611*b*, 611*c* may be spaced apart from the guide portion 611, and the rear surface of the bridge 611*a*, 611*b*, 611*c* may be located parallel to the rear surface of the rear portion 60P. A top bridge 611*a* may be adjacent to the upper end of the guide portion 611, and one section of the top bridge 611*a* may be cut off (see gc in FIG. 9). Each of an upper bridge 611*b* and a lower bridge 611*c* may be located in a rear of the front groove 611Ga, may extend in the left-right direction, and may have both ends connected to the lateral side of the guide portion 611. The upper bridge 611*b* may be spaced downward from the top bridge 611*a*, and the lower bridge 611*c* may be opposite to the top bridge 611*a* with respect to the upper bridge 611*b*.

The upper groove 611Gb may be formed by being recessed from the front surface of the upper bridge 611*b* in a rearward direction, may be opened in the vertical direction, and may face the front groove 611Ga. The lower groove 611Gc may be formed by being recessed from the front surface of the lower bridge 611*c* in a rearward direction, may be opened in the vertical direction, and may face the front groove 611Ga. The upper groove 611Gb and lower groove 611Gc may be collectively referred to as a rear groove 611Gb, 611Gc.

For example, the coupling portion 61 may include a first coupling portion 61*a* adjacent to the left portion 60L and a second coupling portion 61*b* adjacent to the right portion 60R. The first coupling portion 61*a* and the second coupling portion 61*b* may have the same shape.

Referring to FIGS. 11 and 12, the stand 100 may include a body 110 and a leg 120.

The body 110 may extend in the vertical direction. The body 110 may have an overall square plate shape. A first coupling surface 111 may form the front surface of the body 110, and a second coupling surface 112 may form the rear surface of the body 110.

A first seating portion 111*a* may protrude in a forward direction from the first coupling surface 111 and extend upward from the lower side of the first coupling surface 111. The height of the first seating portion 111*a* in the vertical direction may be H21 (see FIG. 11). The upper surface of the first seating portion 111*a* may be perpendicular to the first coupling surface 111 and may be flat. For example, the first seating portion 111*a* may have the shape of a solid cylinder that is cut in half as a whole.

A first protrusion 111*b* may protrude in a forward direction from the first coupling surface 111 and extend upward from the upper surface of the first seating portion 111*a*. The height of the first protrusion 111*b* in the vertical direction may be L21 (see FIG. 11). The sum of the height L21 of the first protrusion 111*b* and the height H21 of the first seating portion 111*a* may be smaller than the height H2 of the body 110. In the direction perpendicular to the first coupling surface 111, the thickness of the first protrusion 111*b* may be smaller than the thickness of the first seating portion 111*a*.

A boss 111*c* may protrude in a forward direction from the first coupling surface 111, may extend in the width direction of the first coupling surface 111, and may be spaced upward from the upper end of the first protrusion 111*b*.

A second seating portion 112*a* may protrude in a rearward direction from the second coupling surface 112 and extend upward from the lower side of the second coupling surface 112. The height H22 of the second seating portion 112*a* in the vertical direction may be greater than the height H21 of the first seating portion 111*a* (see FIGS. 11 and 12). The upper surface of the second seating portion 112*a* may be perpendicular to the second coupling surface 112 and may be flat. For example, the second seating portion 112*a* may have the shape of a solid cylinder that is cut in half as a whole.

A second protrusion 112*b* may protrude in a rearward direction from the second coupling surface 112 and extend upward from the upper surface of the second seating portion 112*a*. The height L22 of the second protrusion 112*b* in the vertical direction may be equal to the height L21 of the first protrusion 111*b* (see FIGS. 11 and 12). The sum of the height L22 of the second protrusion 112*b* and the height H22 of the second seating portion 112*a* may be smaller than the height H2 of the body 110. In the direction perpendicular to the second coupling surface 112, the thickness of the second protrusion 112*b* may be smaller than the thickness of the second seating portion 112*a*.

The leg 120 may include a first leg 121 and a second leg 122. The first leg 121 may protrude in a forward direction from the lower end of the body 110, and the second leg 122 may protrude in a rearward direction from the lower end of the body 110. The first leg 121 and the second leg 122 may extend straight in the front-rear direction. Meanwhile, in some embodiment, the first leg 121 and the second leg 122 may be obliquely extended so that the angle between the first leg 121 and the second leg 122 becomes an obtuse angle. Alternatively, in some embodiment, the leg 120 may have a circular or polygonal plate shape, or have a ring or open-ring shape.

Referring to FIGS. 13 and 14, the body 110 of the stand 100 may be inserted into between the guide portion 611 and the bridge 611*a*, 611*b*, 611*c*. At this time, the first protrusion 111*b* may face forward and may be inserted into the front groove 611Ga. The upper end of the first protrusion 111*b* may be adjacent to or in contact with an upper end 611GS of the front groove 611Ga. That is, the upper end 611GS of the front groove 611Ga may restrict the upward movement of the first protrusion 111*b*. The upper end of the body 110 may be adjacent to or in contact with the upper end 611S of the guide portion 611. That is, the upper end 611S of the guide portion 611 may restrict the upward movement of the body 110.

In addition, the first coupling surface 111 may be in contact with the rear surface of the guide portion 611, and the second protrusion 112*b* may be located in an upper groove 611Gb and a lower groove 611Gc. The recessed portion 611D may be seated on the first seating portion 111*a*.

Accordingly, the stand 100 may be coupled to the coupling portion 61 without the fastening member F1*a*, F1*b*, F2*a*, F2*b* described above with reference to FIGS. 7 and 8, and may support the head 1.

Meanwhile, a stepped portion 611T 1, 611T2 may protrude in a rearward direction from the rear surface of the portion located above the front groove 611Ga of the guide portion 611. A first stepped portion 611T1 may be adjacent to the front groove 611Ga, and a second stepped portion 611T2 may be adjacent to the upper end of the guide portion 611. The first stepped portion 611T1 and the second stepped portion 611T2 may be in contact with the front surface of the portion located above the first protrusion 111*b* of the first coupling surface 111. The boss 111*c* may be located between the first stepped portion 611T1 and the second stepped portion 611T2, and may be in contact with the rear surface of the portion located above the front groove 611Ga of the guide portion 611.

Accordingly, a step may be formed between the first coupling surface 111 and the boss 111*c*, and may prevent the upper end of the body 110 from being caught on the upper end 611GS of the front groove 611Ga during the coupling operation of the stand 100 and the coupling portion 61.

Referring to FIG. 15, the stand 100 may include a plurality of stands spaced apart from each other along the lower portion 60D. A first stand 100*a* may be coupled to the first coupling portion 61*a*, and a second stand 100*b* may be coupled to the second coupling portion 61*b*. The first stand 100*a* and the second stand 100*b* may have the same shape.

Accordingly, the stand 100 may stably support the head 1. At this time, the first leg 121 may face forward, and the second leg 122 may face rearward.

Referring to FIGS. 16 and 17, the body 110 of the stand 100 may be inserted into between the guide portion 611 and the bridge 611*a*, 611*b*, 611*c*. At this time, the second protrusion 112*b* may face forward and may be inserted into the front groove 611Ga. The upper end of the second protrusion 112*b* may be adjacent to or in contact with the upper end 611GS of the front groove 611Ga. That is, the upper end 611GS of the front groove 611Ga may restrict the upward movement of the second protrusion 112*b*. The upper end of the body 110 may be adjacent to the first stepped portion 611T1.

In addition, the second coupling surface 112 may be in contact with the rear surface of the guide portion 611, and the first protrusion 111*b* may be located in the lower groove 611Gc. The recessed portion 611D may be seated on the second seating portion 112*a*.

Accordingly, the stand 100 may be coupled to the coupling portion 61 without the fastening member F1*a*, F1*b*, F2*a*, F2*b* described above with reference to FIGS. 7 and 8, and may support the head 1.

Referring to FIG. 18, the stand 100 may include a plurality of stands spaced apart from each other along the lower portion 60D. The first stand 100*a* may be coupled to the first coupling portion 61*a*, and the second stand 100*b* may be coupled to the second coupling portion 61*b*. The first stand 100*a* and the second stand 100*b* may have the same shape.

Accordingly, the stand 100 may stably support the head 1. At this time, the first leg 121 may face rearward, and the second leg 122 may face forward.

Referring to FIG. 19, the height of the second seating portion 112*a* may be greater than the height of the first seating portion 111*a* (see h20). When the recessed portion 611D is seated on the first seating portion 111*a*, the lower side 60D of the head 1 or the back cover 60 may be located at a first height h31 from the ground. When the recessed portion 611D is seated on the second seating portion 112*a*, the lower side 60D of the head 1 or the back cover 60 may be located at a second height h32 from the ground.

The second height h32 may be greater than the first height h31. That is, a user may adjust the direction of the stand 100 so that the second leg 122 or the first leg 121 faces forward, thereby adjusting the distance between the ground and the head 1.

Referring to FIGS. 1 to 19, a display device according to an aspect of the present disclosure may include: a head including a display panel; and a stand adjacent to one side of the head and supporting the head, wherein the stand may include: a body extending long and coupled to the head, the body having a first coupling surface and a second coupling surface which are opposite to each other in a thickness direction of the head; and a leg extending from a distal end of the body in a direction intersecting with a longitudinal direction of the body, wherein the first coupling surface or the second coupling surface may face a rear surface of the head, and a gap between the one side of the head and the leg may vary according to a direction of the body with respect to the rear surface of the head.

The stand may be adjacent to a lower side of the head, wherein the lower side of the head may be located at a first height from the leg when the first coupling surface faces the rear surface of the head, and may be located at a second height greater than the first height from the leg when the second coupling surface faces the rear surface of the head.

The stand may include: a first seating portion protruding from the first coupling surface in a direction intersecting with the first coupling surface; and a second seating portion protruding from the second coupling surface in a direction intersecting with the second coupling surface, in which in the longitudinal direction of the body, a location of the first seating portion may be different from a location of the second seating portion, and the one side of the head may be seated on the first seating portion or the second seating portion.

The head may further include a recessed portion formed by being pressed from the one side of the head toward the other side opposite to the one side of the head, wherein the recessed portion may be seated on the first seating portion or the second seating portion.

The head may include: a guide portion which is formed by being pressed from the rear surface of the head in a forward direction and which extends in a longitudinal direction of the body; and a bridge which is spaced in a rearward direction from a rear surface of the guide portion and which connects a lateral side of the guide portion, wherein the body may be located between the rear surface of the guide portion and the bridge, and may be in contact with the rear surface of the guide portion and the bridge.

The guide portion may further include a front groove which is formed at the rear surface of the guide portion and which extends in the longitudinal direction of the body, the bridge may further include a rear groove which is formed at a front surface of the bridge and which is opened in the longitudinal direction of the body, and the stand may further include: a first protrusion which protrudes from the first coupling surface and which extends in the longitudinal direction of the body; and a second protrusion which protrudes from the second coupling surface and which extends in the longitudinal direction of the body, wherein among the first protrusion or the second protrusion, any one may be inserted into the front groove, and the other may be inserted into the rear groove.

The front groove may extend from the one side of the head toward the other side opposite to the one side of the head, and may have an open one end and a closed other end, wherein the other end of the front groove may be seated on the first protrusion or the second protrusion.

The stand may further include: a first seating portion which is located between the first protrusion and the leg, which is connected to the first protrusion, and which protrudes further from the first coupling surface than the first protrusion; and a second seating portion which is located between the second protrusion and the leg, which is connected to the second protrusion, and which protrudes further from the second coupling surface than the second protrusion, wherein in the longitudinal direction of the body, a location of the first seating portion may be lower than a location of the second seating portion, a length of the first protrusion may be equal to a length of the second protrusion, and the one side of the head may be seated on the first seating portion or the second seating portion.

The guide portion may have a length greater than the front groove and has an open one end and a closed other end, wherein the other end of the guide portion may be seated on the body when the other end of the front groove is seated on the first protrusion, and may be spaced apart from the body when the other end of the front groove is seated on the second protrusion.

The bridge may include a plurality of bridges spaced apart from each other in the longitudinal direction of the body, wherein the second protrusion may be inserted into the rear groove of the plurality of bridges when the other end of the front groove is seated on the first protrusion, and the first protrusion may be inserted into the rear groove of some of the plurality of bridges when the other end of the front groove is seated on the second protrusion.

In the longitudinal direction of the body, the guide portion may include: a first section in which the front groove is located; and a second section which is a section excluding the first section from the guide portion, the second section including a stepped portion protruding in a rearward direction from the second section, the stand may further include a boss which protrudes from the first coupling surface and is opposite to the first seating portion with respect to the first protrusion, wherein when the other end of the front groove is seated on the first protrusion, the boss may be in contact with the second section, and the stepped portion may be in contact with the first coupling surface.

The body may be slidingly coupled to the head, and the head may be seated on the body and hooked to the body.

At least portion of the body may be located inside the head.

The stand may include: a first stand adjacent to one end of the one side of the head; and a second stand adjacent to the other end of the one side of the head.

The head may include: a frame which is located in a rear of the display panel, and to which the display panel is coupled; and a back cover covering a rear of the frame, wherein the body may be adjacent to a lower side of the back cover and may be coupled to a rear surface of the back cover.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising:

a head including a display panel; and a stand adjacent to one side of the head and supporting the head, wherein the stand comprises:

a body extending long and coupled to the head, the body having a first coupling surface and a second coupling surface which are opposite to each other in a thickness direction of the head;

a first protrusion protruding from the first coupling surface;

a second protrusion protruding from the second coupling surface; and a leg extending from an end of the body in a direction intersecting with a longitudinal direction of the body, wherein the head comprises:

a guide portion recessed from a rear surface of the head and extending in the longitudinal direction of the body;

a bridge protruding from a first side wall of the guide portion to a second side wall of the guide portion, the bridge and facing a bottom of the guide portion;

a front groove formed at the bottom of the guide portion and having a length shorter than a length of the guide portion; and a rear groove formed at a front surface of the bridge, wherein one of the first protrusion or the second protrusion is inserted into the front groove, and another of the first protrusion or the second protrusion is inserted into the rear groove, and wherein a gap between the one side of the head and the leg varies according to a direction of the body with which is inserted between the guide portion and the bridge.

2. The display device of claim 1, wherein the stand is adjacent to a lower side of the head, wherein the lower side of the head is located at a first height from the leg when the first protrusion is inserted into the front groove, and is located at a second height greater than the first height from the leg when the second protrusion is inserted into the front groove.

3. The display device of claim 1, wherein the stand comprises:

a first seating portion protruding from the first coupling surface in a direction intersecting with the first coupling surface; and a second seating portion protruding from the second coupling surface in a direction intersecting with the second coupling surface, wherein in the longitudinal direction of the body, a location of the first seating portion is different from a location of the second seating portion, and the one side of the head is seated on the first seating portion or the second seating portion.

4. The display device of claim 3, wherein the head further comprises a recessed portion recessed from the one side of the head toward another side of the head opposite to the one side of the head, wherein the recessed portion is seated on the first seating portion or the second seating portion.

5. The display device of claim 1, wherein the body is in contact with the bottom of the guide portion and the bridge.

6. The display device of claim 5, wherein the rear groove is opened in the longitudinal direction of the body, wherein the first protrusion extends in the longitudinal direction of the body, and wherein the second protrusion extends in the longitudinal direction of the body.

7. The display device of claim 6, wherein the front groove extends from the one side of the head toward another side of the head opposite to the one side of the head, and has an open end and a closed end, wherein the closed end of the front groove is seated on the first protrusion or the second protrusion.

8. The display device of claim 7, wherein the stand further comprises:

a first seating portion which is located between the first protrusion and the leg, which is connected to the first protrusion, and which protrudes further from the first coupling surface than the first protrusion; and a second seating portion which is located between the second protrusion and the leg, which is connected to the second protrusion, and which protrudes further from the second coupling surface than the second protrusion, wherein in the longitudinal direction of the body, a location of the first seating portion is lower than a location of the second seating portion, a length of the first protrusion is equal to a length of the second protrusion, and the one side of the head is seated on the first seating portion or the second seating portion.

9. The display device of claim 8, wherein the guide portion has a length greater than the front groove and has an one end and a closed end, wherein the closed end of the guide portion is seated on the body when the closed end of the front groove is seated on the first protrusion, and is spaced apart from the body when the closed end of the front groove is seated on the second protrusion.

10. The display device of claim 9, wherein the bridge comprises a plurality of bridges spaced apart from each other in the longitudinal direction of the body, wherein the second protrusion is inserted into the rear groove of the plurality of bridges when the closed end of the front groove is seated on the first protrusion, and the first protrusion is inserted into the rear groove of some of the plurality of bridges when the closed end of the front groove is seated on the second protrusion.

11. The display device of claim 9, wherein in the longitudinal direction of the body, the guide portion comprises:

a first section in which the front groove is located; and a second section which is a section excluding the first section from the guide portion, the second section including a stepped portion protruding in a rearward direction from the second section, wherein the stand further comprises a boss which protrudes from the first coupling surface and is opposite to the first seating portion with respect to the first protrusion, wherein when the closed end of the front groove is seated on the first protrusion, the boss is in contact with the second section, and the stepped portion is in contact with the first coupling surface.

12. The display device of claim 1, wherein the body is slidingly coupled to the head, and the head is seated on the body and hooked to the body.

13. The display device of claim 1, wherein at least portion of the body is located inside the head.

14. The display device of claim 1, wherein the stand comprises:

a first stand adjacent to one end of the one side of the head; and a second stand adjacent to another end of the one side of the head.

15. The display device of claim 1, wherein the head comprises:

a frame which is located in a rear of the display panel, and to which the display panel is coupled; and a back cover covering a rear of the frame, wherein the body is adjacent to a lower side of the back cover and coupled to a rear surface of the back cover.

* * * * *